United States Patent
Söderlund

(10) Patent No.: US 8,377,263 B2
(45) Date of Patent: Feb. 19, 2013

(54) DEVICE FOR REGENERATION OF OILS

(75) Inventor: Roni Söderlund, Virserum (SE)

(73) Assignee: Cot-Clean Oil Technology AB (SE)

( * ) Notice: Subject to any disclaimer, the term of this patent is extended or adjusted under 35 U.S.C. 154(b) by 677 days.

(21) Appl. No.: 11/992,930

(22) PCT Filed: Mar. 23, 2006

(86) PCT No.: PCT/SE2006/000369
§ 371 (c)(1),
(2), (4) Date: Jun. 12, 2009

(87) PCT Pub. No.: WO2007/043928
PCT Pub. Date: Apr. 19, 2007

(65) Prior Publication Data
US 2009/0314687 A1   Dec. 24, 2009

(30) Foreign Application Priority Data

Oct. 10, 2005   (SE) ...................... 0502236

(51) Int. Cl.
*B01D 1/00* (2006.01)

(52) U.S. Cl. ........ 196/115; 196/46.1; 196/121; 196/128

(58) Field of Classification Search ............. 196/46.1, 196/115, 121, 128; 210/180, 188, 742, 744
See application file for complete search history.

(56) References Cited

U.S. PATENT DOCUMENTS

| | | | |
|---|---|---|---|
| 4,295,966 A | | 10/1981 | LeBlanc et al. |
| 4,349,438 A | * | 9/1982 | Sims .............................. 210/180 |
| 4,443,334 A | | 4/1984 | Shugarman et al. |
| 4,943,352 A | * | 7/1990 | Lefebvre et al. ............. 196/46.1 |
| 5,242,034 A | * | 9/1993 | DePaul ........................ 184/6.22 |
| 5,322,596 A | | 6/1994 | Arntz |
| 5,707,515 A | | 1/1998 | DePaul |
| 6,083,406 A | | 7/2000 | DePaul et al. |
| 6,287,455 B1 | * | 9/2001 | Whitmore ...................... 208/179 |
| 7,244,353 B2 | * | 7/2007 | Whitmore et al. .............. 210/85 |
| 7,907,408 B2 | * | 3/2011 | Ippoushi et al. .............. 361/700 |
| 2008/0083676 A1 | * | 4/2008 | DePaul ........................ 210/774 |
| 2012/0006725 A1 | | 1/2012 | Soderlund |

FOREIGN PATENT DOCUMENTS

| | | |
|---|---|---|
| JP | 57-204092 U | 12/1982 |
| JP | 63-012607 U | 1/1988 |
| JP | 63-016114 A | 1/1988 |
| JP | 01-083115 A | 3/1989 |
| JP | H08-505321 A | 6/1996 |
| JP | 2002-510767 A | 4/2002 |

(Continued)

OTHER PUBLICATIONS

"PCT Application No. PCT/SE2006/000369, International Search Report Jun. 21, 2006", 3 pgs.

(Continued)

*Primary Examiner* — Nina Bhat
(74) *Attorney, Agent, or Firm* — Schwegman Lundberg & Woessner, P.A.

(57) ABSTRACT

A device for regenerating oil wherein an oil containing contaminates is placed in contact with at least one point source of heat which is a predetermined temperature and wherein the contaminants contained in the oil are partially evaporated and can be removed leaving an oil which is substantially free of contaminants and even though exposed to elevated temperatures the oil is not damaged or degraded.

17 Claims, 3 Drawing Sheets

FOREIGN PATENT DOCUMENTS

| | | |
|---|---|---|
| RU | 2255967 | 7/2005 |
| WO | WO-87/01609 A1 | 3/1987 |
| WO | WO-94/15689 A1 | 7/1994 |
| WO | WO-99/36153 A1 | 7/1999 |

OTHER PUBLICATIONS

"PCT Application No. PCT/SE2006/000369, Written Opinion mailed Jun. 21, 2006", 4 pgs.

"Australian Application Serial No. 2006300020, Examiner's First Report dated Feb. 28, 2011", 2 pgs.

"Chinese Application Serial No. 2006800375468, First Office Action dated May 8, 2009", (English Translation), 5 pgs.

"Russian Federation Application Serial No. 2008118366, Decision on Grant recieved Feb. 27, 2010", (English Translation, (2010), 3 pgs.

* cited by examiner

DEVICE FOR REGENERATION OF OILS

RELATED APPLICATIONS

This application is a nationalization under 35 U.S.C. 371 of PCT/SE2006/000369, filed Mar. 23, 2006 and published as WO 2007/043928 A1, on Apr. 19, 2007, which claimed priority under 35 U.S.C. 119 to Sweden Patent Application Serial No. 0502236-3, filed Oct. 10, 2005; which applications and publication are incorporated herein by reference and made a part hereof.

TECHNICAL FIELD

The present invention relates to a device for oil regeneration comprising a source of heat. The device for regeneration of oils comprises a transportation device arranged to bring oil, containing a contamination in the form of a liquid, in contact with the source of heat.

BACKGROUND ART

When operating internal combustion engines and hydraulic-mechanical devices, lubricating oil and hydraulic oil, respectively, is used. Internal combustion engines can run on liquid fuel such as e.g. petrol or diesel oil. When the internal combustion engine is operated, the lubricating oil that lubricates the engine becomes contaminated with non-combusted fuel, water, refrigerant and substances from the fuel combustion. Hydraulic oil is contaminated in a similar way but is not subject to any combustion process but on the other hand subject to the oil absorbing water from air humidity and condensation in the tank or from water penetrating the system at changeovers or when cleaning.

There is a desire to clean the oil from unwanted substances without needing to change the oil in the device.

In U.S. Pat. No. 6,083,406 and U.S. Pat. No. 5,707,515 a method and a device, respectively, for cleaning lubricating oil in an internal combustion engine is shown. The device comprises a particle filter that initially cleans the oil from particles and a liquid separation part intended for separating liquid in the form of water and fuel from the particle free oil. The liquid separation part comprises a substantially dome shaped heat plate. In one embodiment the dome shaped heat plate comprises a flat top and a number of, in a stair shaped structure below each other, slanted flat surfaces connected with elevations. The functioning of the device is as follows:

The particle free but from other liquids contaminated oil is sprinkled over the top of the dome shaped heat plate, after which the oil is supposed to, with the help of gravitation, to flow in a film along the sides of the heat plate, e.g. along the slanted flat surfaces of the heat plate. The function of the elevations is to stop the flow of oil in order for the oil to remain on the heat plate for a certain period.

The heat plate is manufactured of heat conductive material such as aluminium and is evenly heated by a thermostatically controlled heating coil. The complete oil film is brought to a temperature, by the heat plate, where the liquid can "boil" off from the oil which remains on the plate.

The evaporated liquid is captured and brought back to the combustion chamber and the cleaned oil is brought back to the engine, e.g. to a oil container or oil tray.

The method disclosed in U.S. Pat. No. 6,083,406 and the device in U.S. Pat. No. 5,707,515 both have a number of drawbacks.

The oil leaving the particle filter has a temperature of approximately 90° C. which means that the oil sprinkled over the heat plate can have a maximum temperature of approximately 90° C. Diesel oil has a boiling point at 250° C.-300° C. and lubricating oil has a considerably higher boiling point. The lubricating oil is however temperature sensitive but can be exposed to relatively high temperatures above 140° C., but only for a short period. Even if the diesel oil does not reach its boiling point, the diesel oil is partly evaporated at a lower temperature with an increasing degree dependent on increasing temperature. To achieve a maximum evaporation of diesel oil the temperature of the lubricating oil should therefore be increased to a maximum which the lubricating oil can withstand. The lubricating oil can withstand a high temperature for a short period better than a low temperature for a long period. The worst alternative is however high temperature under a long period as the oil is oxidized and destroyed.

The heat plate according to U.S. Pat. No. 6,083,406 and U.S. Pat. No. 5,707,515 aim at, through the use the elevations, to stop the flow of oil in order that all oil should have time to be heated to a certain temperature and in this way be able to "boil" off the contamination over the complete surface of the plate. This is a drawback as a high flow of oil is aimed at to achieve cleaning of big quantities of oil per unit of time. At the same time the low flow gives a long dwell time for the oil on the hot plate.

An example of a suitable oil flow is 0.65 l/minute. To be able to heat the oil from 90° C. to approximately 140° C. at this flow rate the oil needs an addition of 1 Kilowatt. The heat plate according to U.S. Pat. No. 6,083,406 and U.S. Pat. No. 5,707,515 is not capable of handling flows in this order, but is limited to a lower flow to give the desired temperature increase, with the result that the oil is destroyed because of the long dwell time. If the flow was allowed to increase, the temperature of the whole heat plate would need to be increased for the oil to have time to be heated. Higher temperature makes however the oil at the edges, where the oil has the slowest flow, running the risk of getting burnt and stuck and/or be destroyed through oxidization. Thus the method and device according to U.S. Pat. No. 6,083,406 and U.S. Pat. No. 5,707,515 are limited to low flow rates only. The low flow rate means that the oil circulation becomes too low to be able to achieve an effective cleaning process as the object is to clean all oil in the lubricating system of the engine.

The problem area is also made worse because of the fact that the outdoor temperature differs in different climates in different parts of the world, which affects the temperature of the oil entering the liquid separation part. Cold conditions give colder oil and further energy is therefore required in order for the oil to reach the right temperature. Warm conditions give warmer oil requiring the heat from the heat plate to be regulated to compensate the heat increase in order for the oil not to reach too high temperature and be destroyed. A properly working regulating arrangement for the heat plate is thus necessary for a properly working system. Such a regulating arrangement comprises thermostats and other regulators comprising moving parts which in this delicate context is a possible cause for malfunction causing limited useful life, and causing destroying high oil temperatures. Such a regulating arrangement is also expensive and hard to install.

Further problems with the device are that the heat plate has to be located horizontally in order for the oil, supplied from above, with the help of gravitation should be evenly distributed over the plate and in this way create a thin film. Problems are also encountered when the engine changes position, e.g. when a vehicle is driven in a curve. The cause for this being the change of the engine position causing change of the position of the device. The oil is also subject to a side force when it is sprinkled towards the liquid separation part. Both the change of position and the side force causes an uneven distribution of the oil over the heat plate as the gravitation alone can not distribute the oil evenly at said conditions. The device is thus limited to a horizontal position and can not be installed in another angle than 180° towards gravitation and can not be used at optimum in a vehicle used in curves and hills.

Hydraulic oil contaminated with water has analogue problems. The boiling point of water is 100° C. and the hydraulic oil has a maximum temperature of 80° C., but a working temperature of approximately 50° C. The oil has to be heated as much as it can take during as short period as possible to give the best evaporation of water at as high flow rate as possible. Also in this case it is a problem with the homogeneously heated heat plate which is limited to low flow rates for the same reason as mentioned above.

Thus, there is a desire for an improved device and an improved method for regeneration of oil in an internal combustion engine. Over and above this there is in the same way a desire for an improved regeneration of hydraulic oil.

DISCLOSURE OF INVENTION

The present invention relates to a device for oil regeneration and a method for oil regeneration where the drawbacks above are eliminated. The oil regeneration device is intended to be connected to an internal combustion engine for cleaning of lubricating oil and to a hydraulic machine for regeneration of hydraulic oil.

The oil regeneration device comprises a heat source and a transportation device arranged to bring oil, containing a contamination in the form of a liquid, in contact with the source of heat. The invention is characterized in that the source of heat comprises at least one point source with a predetermined temperature that at an interface between the point source and the oil corresponds to a maximum allowed oil temperature. The maximum allowed oil temperature depends of the dwell period of the oil at the point source, i.e. the time period the oil is exposed to the heat, and the composition of the oil. As mentioned earlier, the oil can stand a high temperature during a short period better than a lower temperature during a long period. In this context a lower temperature means a temperature above a specific oil temperature at which the oil starts to be damaged by the temperature in combination with the time.

An advantage of the invention is that the point source gives an immediate heating of the contamination in the oil when the oil comes in contact with the point source without the oil being destroyed or getting burnt and stuck. Immediate heating here means that the surface temperature on the point source always corresponds to the maximum oil temperature in respect of dwell-time which results in that at least a thin layer of the oil being in contact with the point source essentially immediately reaches maximum oil temperature at which the contamination at least partially is evaporated. After that the oil is transported away from the point source such that the oil no longer is subject to heating. This gives the advantage that the dwell-time for the oil at the point source becomes minimal, giving possibilities for a high temperature.

According to an embodiment of the invention the source of heat comprises at least two point sources. The source of heat can of course comprise a large number of point sources, depending on the amount of oil to be regenerated or the desired degree of purity. The oil can then be transported from point source to point source, at each point source to be subject to maximum temperature with respect to dwell-time. The number of point sources must, however, not be that many per area unit such that the oil continuously is affected by the same temperature resulting in the total dwell-time becomes too long.

According to an embodiment of the invention, the different point sources have different temperatures depending on their location. Where the flow rate is high the temperature is high and where the flow rate is low the temperature is correspondingly low. An advantage with this is that the oil is always heated to its maximum temperature depending on the given dwell-time.

A further advantage with the invention is that the regulation of the heating source is not necessary as the size of the point source allows for keeping the temperature steady, i.e. that the temperature is constant. The lack of regulating arrangement gives a low cost device easy to apply, and minimizes the risk for a too high temperature.

As the point source can be kept at a constant temperature the oil regeneration device according to the invention can be used at high flow rates giving a continuous high degree of purity of the oil because the oil circulation can be kept high.

According to an embodiment the point source is constituted of a semiconductor. The advantage with a semiconductor is that when switched on the semiconductor is brought to exactly the right temperature which also is constant with the advantages given above. Another advantage with using semiconductors is that regulation of the temperature of the point source depending on different conditions becomes optimally simple by only increasing or decreasing the current to the semiconductors.

A preferred type of semiconductor is a positively temperature dependent resistor, a so-called PTC (Positive Temperature Coefficient). Other types of possible semiconductors are NTC (Negative Temperature Coefficient) giving current limitation but which also generates heat. A combination of the two is also possible.

The oil regeneration device also comprises electrical connections for power to the point source.

According to an embodiment of the invention the transportation device comprises a support substrate supporting the heat source. The support substrate is heat conducting and the interface consists of the contact surface between the support substrate and the oil. The heat source in this case also comprises the support substrate which means that the oil is brought in contact with the point source via the support substrate. To compensate for the transportation loss of heat from the point source through the support substrate to the interface, the point source can be required to be brought to a temperature exceeding the evaporation temperature, but the temperature at the interface corresponds to the evaporation temperature of the contamination.

According to an embodiment of the invention the support substrate consists of a material conducting heat poorly or not at all. The point source is then supported by the support substrate in such a way that the oil comes in direct contact with the point source.

According to an embodiment of the invention the support substrate comprises a substantially conical and/or convex unit, and/or a stair shaped unit. The design of the support substrate together with the gravitation makes the oil flow along the unit and, due to its motion, be brought in contact with the point source.

The support substrate can have optional geometry, e.g. circular, oval, triangular, square-shaped, multi-edged, or a combination of the geometries mentioned. The support substrate must however not be designed in such a way that it because of the oil cools the point sources in such a way that the output of the heat source is reduced and therefore affects the regeneration efficiency in a negative way.

The support substrate can consist of a waterproof unit where the oil is flowing on the surface of the waterproof unit. The support substrate can consist of a liquid pervious unit where the oil can flow freely through the support substrate. The support substrate can furthermore consist of a structure similar to fabric through which the oil can flow or be pressed. In the latter case the oil is pressed with pressure through the substrate. An advantage with a structure similar to fabric is that the oil is given two possibilities to get in contact with the point source. One possibility is in the interface between the oil and the support substrate and the other is in direct contact with the point source.

According to an embodiment of the invention the support substrate comprises a transportation device in the form of a coupling device connectable to an oil container. The coupling device advantageously consists of a threaded pin which can be threaded to a corresponding part at the oil container. A particle filter may be located between the oil container and the coupling device. The coupling device is then coupled to the particle filter. An oil container is here meant a container intended to keep oil. An oil container can e.g. be an internal combustion engine or a hydraulic construction. Typical for such arrangements is that there is a collecting vessel for oil, e.g. an oil tray, from which the oil is brought to the active parts for which the oil is intended to be used. During use the oil is contaminated and is brought to the oil regeneration device which separates at least parts of the contamination from the oil. The oil is then brought back to the collecting vessel.

According to an embodiment of the invention the coupling device comprises at least one conduit extending through the oil regeneration device and arranged to transport oil from the oil container to the point source. In use the oil regeneration device is installed such as to allow gravitation to move the oil from the conduit to the point source.

The oil regeneration device can be installed such that gravitation distributes the oil symmetrically or asymmetrically over the support substrate. The oil regeneration device can thus be installed straight or inclined in relation to a vertical line. The conduit can be entirely through-going the coupling device such that the oil is brought essentially against gravitation until it passes through a top part at the coupling device, after which the oil is subject to gravitation and flows along the coupling device and the support substrate.

According to an embodiment of the invention the support substrate comprises a roof construction where the point source is located above the mouth of the coupling device. The oil is sprinkled in the "roof", i.e. in a direction opposite to gravitation, where heating of the contamination is instantaneous at contact after which the oil due to gravitation is transported away from the support substrate.

According to an advantageous embodiment the conduit is branched before the top part in a number of conduits perpendicular to said conduits giving a lateral flow.

The lateral flow allows a smaller size for the oil regeneration device as special spray arrangements do not have to be considered. Another advantage is that the lateral flow decreases the dependency of gravitation.

According to an embodiment of the invention the coupling device comprises a square-shaped part comprising two conduits extending from side to side and that are crossed in the middle. These conduits are in the crossing connected with the conduit conducting the oil from the oil container. This design gives the possibility to a lateral flow, with the advantages mentioned above. The coupling device can furthermore comprise a thread, threaded from side to side through each conduit. The threads vibrate due to the oil flow and prevent the oil from forming lumps in the conduits.

The square-shaped part has the advantage from design point of view that the support substrate easily can be clamped to the coupling device during manufacturing.

According to an embodiment of the invention the support substrate consists of a vertical construction wherein the point source is positioned on a vertical wall at the side of the mouth of the coupling device. The oil is sprinkled towards the vertical wall, i.e. 90° in relation to gravitation, wherein heating up of the contamination is carried out instantaneous at contact whereupon the oil due to gravity is transported away from the support substrate along the vertical wall.

According to an embodiment of the invention the support substrate is a part of the transportation device and realized as a movably arranged support substrate arranged to bring the point source in contact with the oil. The transportation device can in this case consist of a support substrate realized as a cylinder with the point sources attached to the envelope surface of the cylinder. Part of the envelope surface of the cylinder, a segment of the envelope surface, is dipped in an oil bath while the cylinder is rotating. The oil is attached to the envelope segment as a film and can during rotation outside the oil bath perform the desired heating, at which the contamination departs in an evaporation phase and the oil remains on the envelope segment until the envelope segment once more is dipped into the oil bath.

In another embodiment of the invention the transportation device comprises a movable support substrate comprising a rotating plate where the oil is applied mainly in the centre of the plate and is forced to the edges of the plate due to centrifugal force. During transportation towards the plate edges the oil is brought in contact with the point source and the contamination is vaporized.

An advantage with a rotating system is that you are completely independent of gravitation for the distribution of the oil.

According to an embodiment of the invention the oil regeneration device comprises a house being impervious to gas and liquid. The house can be arranged above the support substrate and attached to the outer edges of the support substrate in such that the support substrate together with the house forms a gas- and liquid tight unit. The house can also be designed to surround the complete support substrate and can in this case e.g. be attached towards the coupling device.

The house advantageously comprises an opening where the separated contamination can be transported away, and openings where the remaining cleaned oil can be transported away from the oil regeneration device. The house can be subject to a sub-atmospheric pressure, e.g. by a connection to a low crankcase pressure. The sub-atmospheric pressure lowers the temperature of evaporation for the contamination and thus facilitates the separation from the oil. The sub-atmospheric pressure also facilitates the transportation of the gaseous contamination away from the oil regeneration device.

According to an embodiment of the invention the oil regeneration device comprises a pump arrangement for oil. The pump arrangement is advantageously run by the oil pressure in the machine coupled to the oil regeneration device. The pump arrangement can consist of a set of gearwheels on the primary side run by the oil pressure of the machine and where the primary side runs a secondary side pumping oil to the oil regeneration device. In the case with internal combustion engine the advantage with a pump arrangement run by oil pressure that the oil regeneration device is independent of the pressure status of the engine/crankcase and that the sub-atmospheric pressure in the house thus can be increased.

According to an embodiment of the invention the gearwheels on the secondary side can be heated to preheat the oil.

An example is given below for an internal combustion engine to which the present oil regeneration device can be connected.

30 litres of oil in the tray
Oil flow in the oil regeneration device is 6 decilitre/minute
Cylinder volume of 9 litres
350 horse powers
Oil temperature from engine is about 100° C.
Temperature loss in particle filter is 10°

The support substrate has a surface of 15 centimeter in diameter and the number of point sources are 20. The number of point sources can however be more or fewer depending on the size of the point sources.

The point source has a size of at least 1 square centimeter and a maximum of 5 square centimeters.

The temperature of the point source is 140° C.-220° C. depending on the heat resistance of the lubricating oil and the dwell time.

End of example.

In an internal combustion engine the flows varies between approximately 0.3 litres/minute and approximately 0.8 litres/minute. The low flow 0.3 litres/minute is valid at idling and is not an optimal flow, but the device works at all low flows as the temperature is constantly kept at maximum temperature for the oil with respect to dwell time.

Maximum- and minimum-flows that the oil regeneration device is capable to handle varies considerably depending on the power of the point source and the dwell time. The flow rates and temperatures given above are thus not limiting for the invention.

For hydraulic machines a temperature of approximately 80° C. for the point source is valid at a flow rate of up to approximately 1.6 litres/minute. Other temperatures and flows are of course possible depending on dwell time and the properties and composition of the hydraulic oil.

BRIEF DESCRIPTION OF DRAWINGS

The invention will now be described below in association to a number of figures where.

EMBODIMENT(S) OF THE INVENTION

Figure 1:
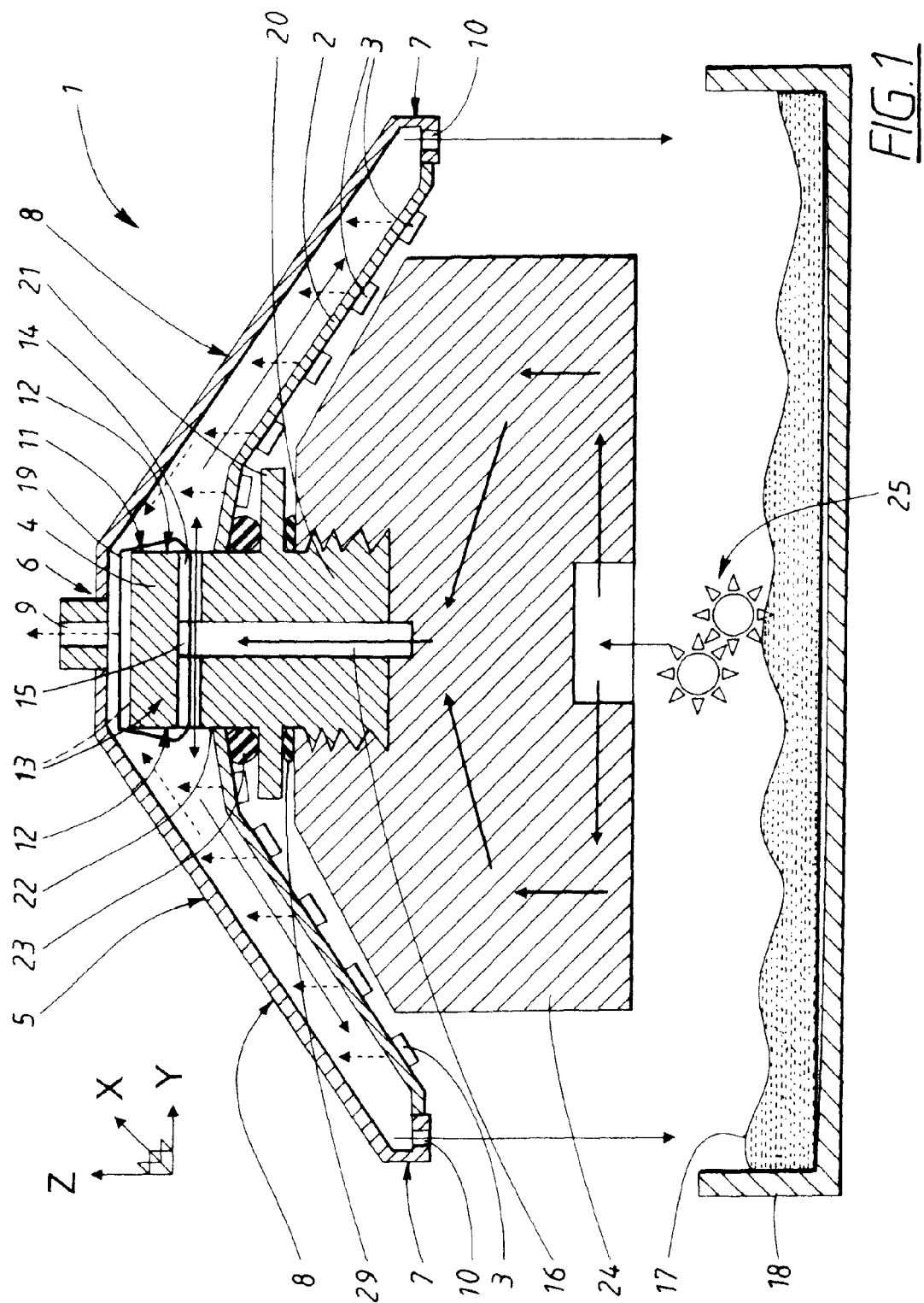
FIG. 1 shows an explanatory sketch of a cross cut seen from the side of an oil regeneration device according to an embodiment of the invention.

FIG. 1 shows an explanatory sketch of a cross cut seen from the side of an oil regeneration device 1 according to an embodiment of the invention.

In order to be able to easily describe the invention an orthogonal system is indicated in FIG. 1 including X-, Y- and Z-directions. X- and Y-direction is sometimes generically called lateral direction.

The oil regeneration device 1 comprises a support substrate 2, a number of point sources 3 for heating, a coupling device 4 and a house 5 covering the support substrate. When the oil regeneration device 1 is installed such that gravitation gives an even distribution of oil over the support substrate 2 vertical direction is described as Z-axis and a horizontal plane as X- and Y-axis.

The house 5 comprises an upper part 6 and a lower part 7 as well as a middle part 8 that connects the upper part 6 with the lower part 7. The house 5 comprises an opening 9 in the upper part 6 and openings 10 in the lower part 7.

The coupling device 4 comprises a square shaped part 11 with two opposite sides 12 extending in X- and Z-direction and two opposite sides 13 extending in Y- and Z-direction. The coupling device 4 comprises two conduits 14, 15 extending between respective two opposite sides 12, 13 and that are crossed in the centre. These conduits 14, 15 are connected with a conduit 16 in the crossing that extends in the Z-direction and that carries oil 17 from an oil container 18. The conduit 16 extending in Z-direction is included in the coupling device 4. The coupling device 4 comprises further two threads 19 that respectively are thread from side to side through each laterally extending conduit 14, 15. The threads 19 can be connected with each other on the outside of coupling device 4.

FIG. 1 shows that the design with lateral spread of oil gives a possibility to minimize the size of house 5 by having the house 5 following the shape of the support substrate 2.

The coupling device 4 further comprises a threaded round part 20 extending in Z-direction. The square shaped part 11 and the round part 20 is separated by a flange 21. The support substrate 2 is attached to the square shaped part 11 through a square shaped opening 22 in the support substrate. Between the flange 21 and support substrate 2 is a gasket 23, e.g. an O-ring.

FIG. 1 shows an oil regeneration device 1 installed at an oil filter 24 via the threaded round part 20. The oil filter 24 is a particle filter removing particles of optional size. FIG. 1 shows with solid arrows the transport of the oil 17 from the oil container 18, through the oil filter 24, through the coupling device 4 to the support substrate 2 and finally out through the lower openings 10 for transportation back to the oil container 18. Between the flange 21 and the oil filter 24 is a gasket 29, e.g. an O-ring.

The point sources 3 are attached to the underside of the support substrate and are not in direct contact with the oil 17. The support substrate 2 is heat conducting which means that the point sources 3 generates point heating sources on the upper side of the support substrate.

FIG. 1 shows transport of an evaporated contamination with dashed arrows from point sources 3 to the opening 9 in the upper part 6.

FIG. 1 shows two gear wheels corresponding to a pump arrangement 25 for the oil 17 to the oil filter 24.

Figure 2:
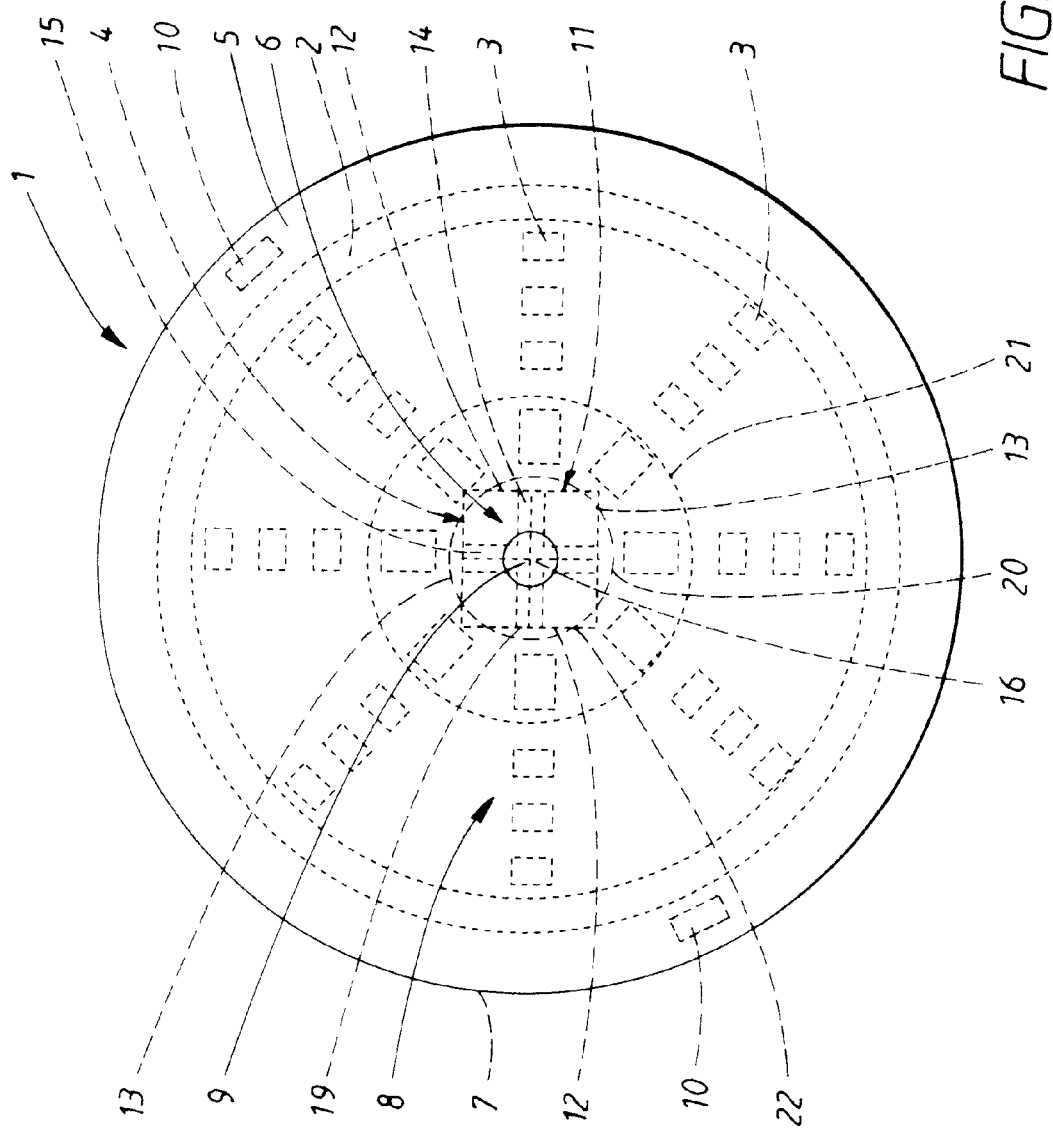
FIG. 2 shows an explanatory sketch from above of an oil regeneration device according to the embodiment in FIG. 1, and where.

FIG. 2 shows an explanatory sketch from above of an oil regeneration device 1 according to the embodiment in FIG. 1. FIG. 2 shows that the support substrate consists of a saucer looking circular plate comprising a number of point heating sources 3. The house 5 has a corresponding geometrical design as the support substrate 2.

Figure 3:
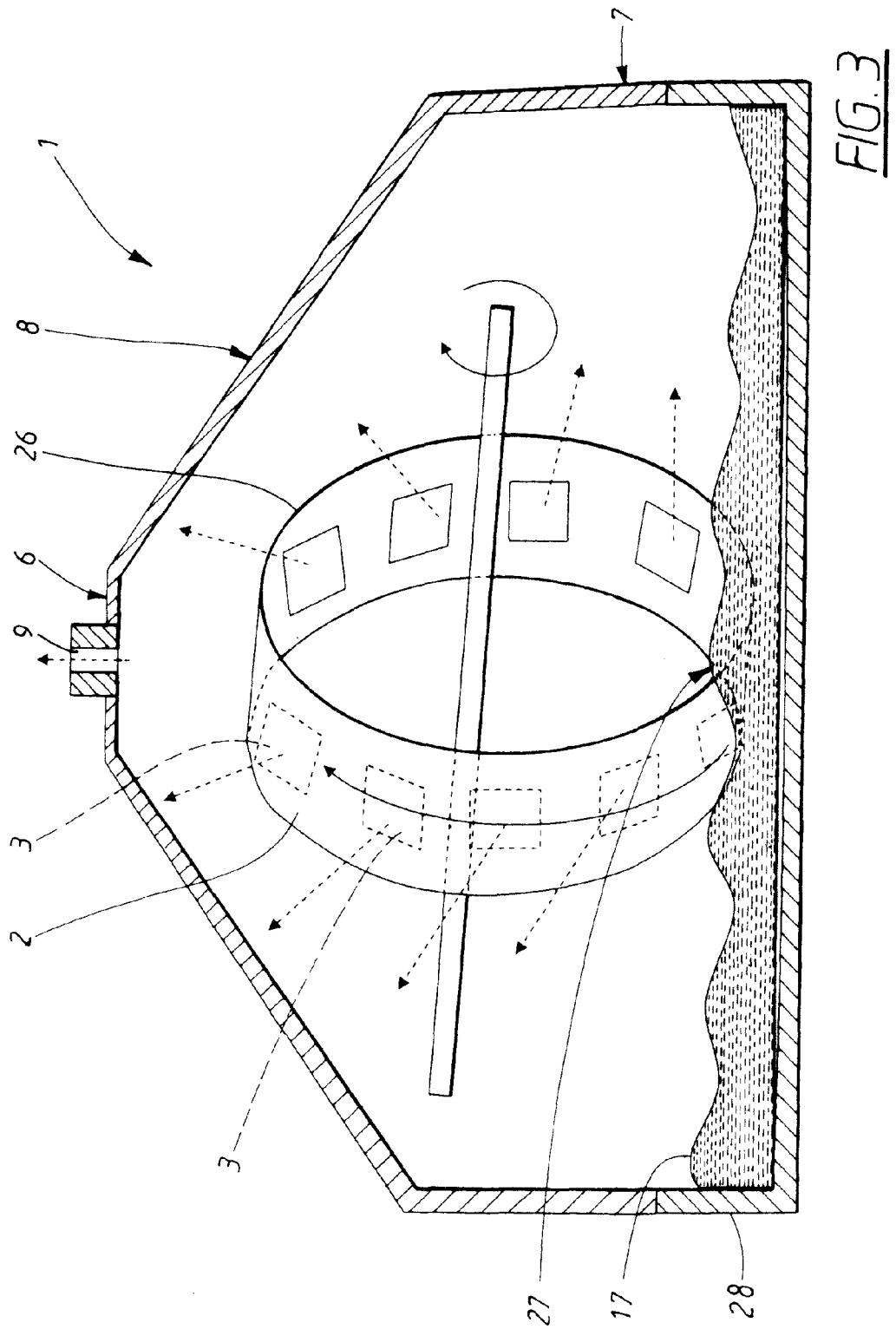
FIG. 3 shows an explanatory sketch in perspective of an oil regeneration device according to an embodiment of the invention.

FIG. 3 shows an explanatory sketch in perspective of an oil regeneration device 1 according to an embodiment of the invention.

FIG. 3 shows that the support substrate 2 is movable and arranged to bring the point source 3 in contact with the oil 17. The support substrate 2 is realized as a cylinder where the point sources 3 are attached to the envelope surface 26 of the cylinder. A part of the envelope surface 26, a segment of the envelope surface 27, is dipped in an oil bath 28 while the cylinder is rotating. The oil 17 is stuck to the envelope segment 27 as a film and can during rotation outside the oil bath perform the desired heating, at which the contamination departs in an evaporation phase and the oil 17 remains on the envelope segment 27 until the envelope segment 27 once more is dipped in the oil bath 28. As in FIG. 1 the transportation of the oil 17 is shown with solid arrows and the transportation of the evaporated contamination with dashed arrows.

The invention claimed is:

1. An oil regeneration device, comprising:
at least one point source of heat, a transportation device arranged to bring oil, containing a contamination in the form of a liquid, in contact with the at least one point source of heat, wherein the transportation device comprises a support substrate supporting the at least one point source of heat, where the area of the at least one point source of heat being a part of the area of the support substrate, the oil flowing on at least a surface of said support substrate, the at least one point source of heat having a predetermined temperature that, at an interface between the at least one point source of heat and the oil, corresponds to a predetermined maximum allowed oil temperature which, with respect to the dwell time the oil is exposed to the at least one point source of heat, allows the contamination to be at least partially evaporated, the predetermined maximum allowed oil temperature being substantially higher than a specific temperature at which the oil starts to be damaged irrespective of the dwell time the oil is exposed to the at least one point source of heat.

2. The oil regeneration device according to claim 1, wherein the heat source comprises at least two point sources.

3. The oil regeneration device according to claim 2, characterized in that the temperature is constant.

4. The oil regeneration device according to claim 3, wherein the transportation device comprises a support substrate carrying the heat source.

5. The oil regeneration device according to claim 4, wherein the support substrate is heat conductive and wherein the interface consists of the contact surface between the support substrate and the oil.

6. The oil regeneration device according to claim 5, wherein the support substrate comprises at least one of a group consisting of a substantially conical unit, a convex unit, and a stair shaped unit.

7. The oil regeneration device according to claim 6, wherein the support substrate comprises a coupling device connectable to an oil container.

8. The oil regeneration device according to claim 7, wherein the coupling device includes at least one conduit extending at least partly through the coupling device and arranged to transport oil from the oil container to the point source.

9. The oil regeneration device according to claim 4, wherein the transportation device comprises a movable support substrate arranged to bring the point source in contact with the oil.

10. The oil regeneration device according to claim 9, wherein the point source is realized as a semiconductor.

11. The oil regeneration device according to claim 10, wherein the point source has a size of maximum 5 square centimeters.

12. The oil regeneration device according to claim 1, wherein the temperature is constant.

13. The oil regeneration device according to claim 12, wherein the transportation device comprises a support substrate carrying the heat source.

14. The oil regeneration device according to claim 13, wherein the support substrate is heat conductive, and wherein the interface consists of the contact surface between the support substrate and the oil.

15. The oil regeneration device according to claim 13, wherein the support substrate comprises at least one of a group consisting of a substantially conical unit, a convex unit, and a stair shaped unit.

16. The oil regeneration device according to claim 13, wherein the support substrate comprises a coupling device connectable to an oil container.

17. The oil regeneration device according to claim 13, wherein the transportation device comprises a movable support substrate arranged to bring the point source in contact with the oil, wherein the point source includes a semiconductor, and wherein the point source has a size of maximum 5 square centimeters.

* * * * *

UNITED STATES PATENT AND TRADEMARK OFFICE
CERTIFICATE OF CORRECTION

PATENT NO.       : 8,377,263 B2                                          Page 1 of 1
APPLICATION NO. : 11/992930
DATED            : February 19, 2013
INVENTOR(S)      : Roni Söderlund It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

First Day of September, 2015

Michelle K. Lee
*Director of the United States Patent and Trademark Office*